United States Patent [19]

Becker

[11] 4,305,192

[45] Dec. 15, 1981

[54] METHOD OF FABRICATING A COMPOSITE HORIZONTALLY SPLIT CASING

[76] Inventor: John H. Becker, 4627 Pine Mountain Rd., Mountain Brook, Ala. 35213

[21] Appl. No.: 76,336

[22] Filed: Sep. 17, 1979

Related U.S. Application Data

[63] Continuation of Ser. No. 946,318, Sep. 27, 1978, abandoned.

[51] Int. Cl.³ .............................................. B23P 15/00
[52] U.S. Cl. ................................ 29/156.4 R; 29/463; 228/184
[58] Field of Search .................... 29/156.4 R, 156.8 R, 29/463, DIG. 5; 228/184, 182; 415/201, 219 C, 219 R, 198.1, 199.1, DIG. 3, DIG. 5

[56] References Cited

U.S. PATENT DOCUMENTS

| 1,745,854 | 2/1930 | Lawaczeck | 415/219 C |
|---|---|---|---|
| 2,095,128 | 10/1937 | Doran | 415/219 R |
| 2,153,287 | 4/1939 | Wallace et al. | 29/463 |
| 2,601,828 | 7/1952 | Lobanoff | 415/201 |
| 2,775,469 | 12/1956 | Brown et al. | 29/463 |

FOREIGN PATENT DOCUMENTS 137880  1/1920  United Kingdom ................ 415/201

*Primary Examiner*—Daniel C. Crane
*Attorney, Agent, or Firm*—Thompson, Birch, Gauthier & Samuels

[57] ABSTRACT

A composite horizontally split casing includes an inlet end having upper and lower cast inlet end sections, an outlet end having upper and lower cast outlet end sections, and separable upper and lower semi-cylindrical shell sections extending axially between the inlet and outlet ends. The upper semi-cylindrical shell section is welded at opposite ends respectively to the upper inlet and outlet end sections to form an upper casing half. The lower semi-cylindrical shell section is likewise welded at opposite ends respectively to the lower inlet and outlet end sections to form a lower casing half. External bolting flanges on the upper and lower casing halves provide the means by which the upper casing half is mounted on the lower casing half.

1 Claim, 4 Drawing Figures

METHOD OF FABRICATING A COMPOSITE HORIZONTALLY SPLIT CASING

This is a continuation of application Ser. No. 946,318 filed Sept. 27, 1978, now abandoned.

DESCRIPTION OF THE INVENTION

This invention relates generally to large industrial compressors, pumps and other similar types of equipment which include exterior housings commonly referred to as "horizontally split casings", and more particularly to an improved design for such casings as well as to its method of manufacture.

Horizontally split casings are comprised basically of separable top and bottom casing halves, each casing half having a heavy horizontal bolting flange at its periphery. The bolting flanges are appropriately drilled to accept large bolts which provide the means for holding the two casing halves together.

In the past, horizontally split casings have been either "all cast" or "all fabricated". In the all cast designs, the upper and lower casing halves are integrally cast as separate unitary sections. In the all fabricated designs, each casing half comprises a weldment made up of separately wrought components, such as for example inlet and outlet nozzles, peripheral flange sections, barrel sections, casing ends, etc. As herein employed, the term "wrought" is intended to include all types of shaping operations other than casting, including for example rolling, bending, cutting, etc.

The all cast casings have generally proven to be satisfactory for smaller sizes having internal diameters of up to approximately 40 inches. Depending on design operating conditions, such casings will weigh approximately 20,000 pounds. However, problems are encountered when attempts are made to employ the all cast design for larger casing sizes, particularly those having internal diameters above 60 inches. One such problem stems from the difficulty of properly anchoring and supporting the molds during a casting operation in order to withstand the buoyant forces of the molten metal and thereby produce dimensionally satisfactory castings. If the cores are allowed to shift as liquid metal is being poured, the entire casting will likely be scrapped due to its inability to withstand internal operating pressures. In less extreme cases, even if the casting is salvaged, in all probability extensive machining will be required in order to correct the resulting dimensional inaccuracies.

Another problem with all cast casings is that they also suffer in quality as their sizes increase. This is because it becomes increasingly difficult to efficiently pour the large amounts of molten metal required. For example, a casing in the 80-90 inch internal diameter range may weigh 80,000-100,000 pounds. If the yield factor of the casting operation is 40% (due primarily to material loss in mold gates), it may be necessary to actually pour upwards of 200,000 pounds of molten metal. Given existing foundry technology, this is difficult and in most cases impossible to accomplish without making significant sacrifices in the quality of the resulting product.

The foregoing problems have encouraged the industry to seek alternatives to the all cast design for the larger casing sizes. The alternative which has thus far been relied upon is the all fabricated design, which completely avoids cast components. Instead, each casing half is broken down into sections, for example semi-cylindrical shell halves, flanges, dished heads, etc. which are separately wrought and thereafter welded together. While this technique avoids casting problems, other equally serious problems are presented. For example, it becomes difficult and in many cases impossible to bend and weld sections having optimum wall thicknesses, especially for high pressure applications. These problems are particularly acute at the casing ends, which support the rotor bearings as well as at the nozzle locations, where the casing shells are weakened considerably. To provide needed strength, the fabricator frequently must resort to the use of externally welded gussets or the like, which add significantly to the overall cost of the resulting casing. In cases where such additional reinforcing techniques are inadequate, it becomes necessary to either revert to an all cast design with all of its above-mentioned difficulties, or alternatively to lower the pressure rating of the casing. When this is done, additional tandem-operated machines must usually be added in order to meet process requirements, and of course, this adds considerably to the overall cost of the installation.

With regard to the foregoing, a general object of the present invention is to provide a third and significantly improved alternative design for horizontally split casings.

A more specific objective of the present invention is the provision of a "composite" casing design wherein the upper and lower casing halves comprise weldments combining both cast and wrought components.

A still further objective of the present invention is the provision of a unique composite design for a horizontally split casing which incorporates many of the advantageous features of the previously known all cast and all fabricated designs, while avoiding the problems associated with such known designs.

These and other objects and advantages of the present invention will become more apparent as the description proceeds with the aid of the accompanying drawings, wherein.

Figure 1:
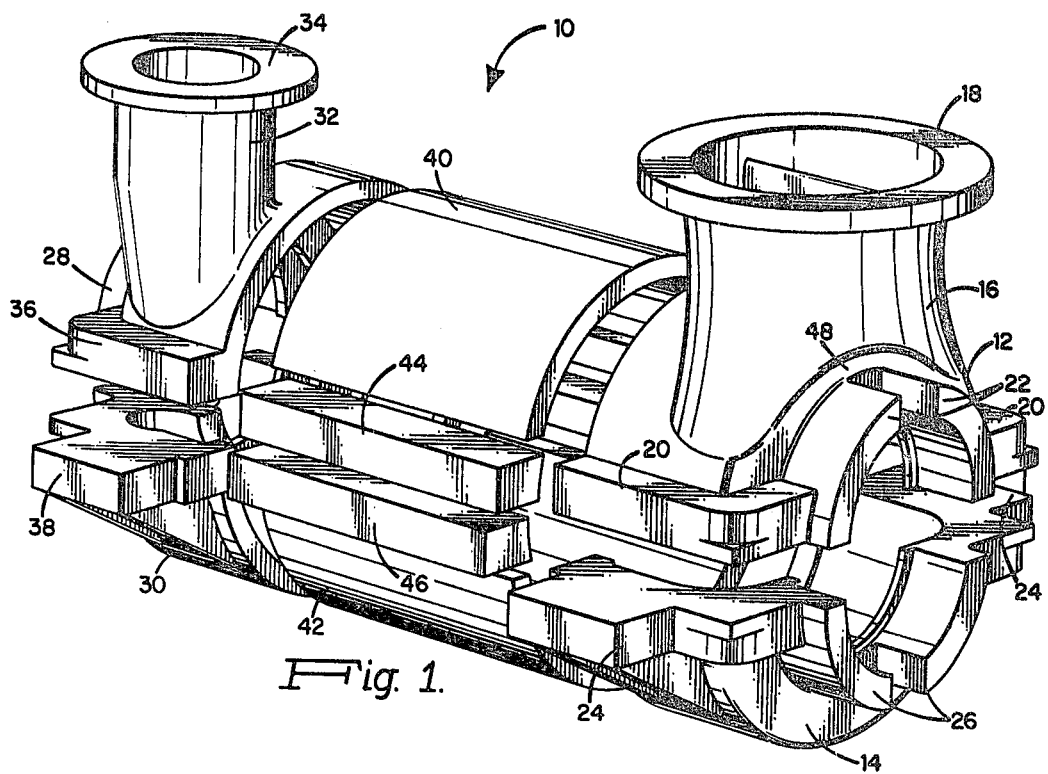
FIG. 1 is a perspective view of a horizontally split composite casing embodying the concepts of the present invention with the individual casing components shown in an exploded condition prior to the assembly thereof by welding into upper and lower casing halves.
Figure 2:
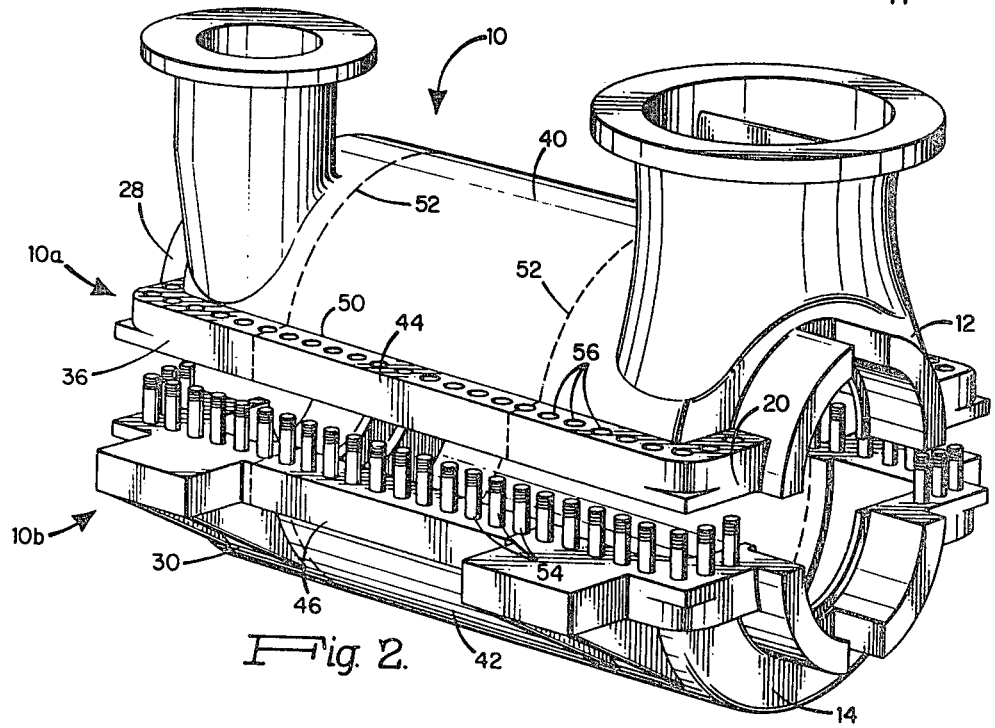
FIG. 2 is a view similar to FIG. 1 showing the casing components welded together to form upper and lower casing halves.
Figure 3:
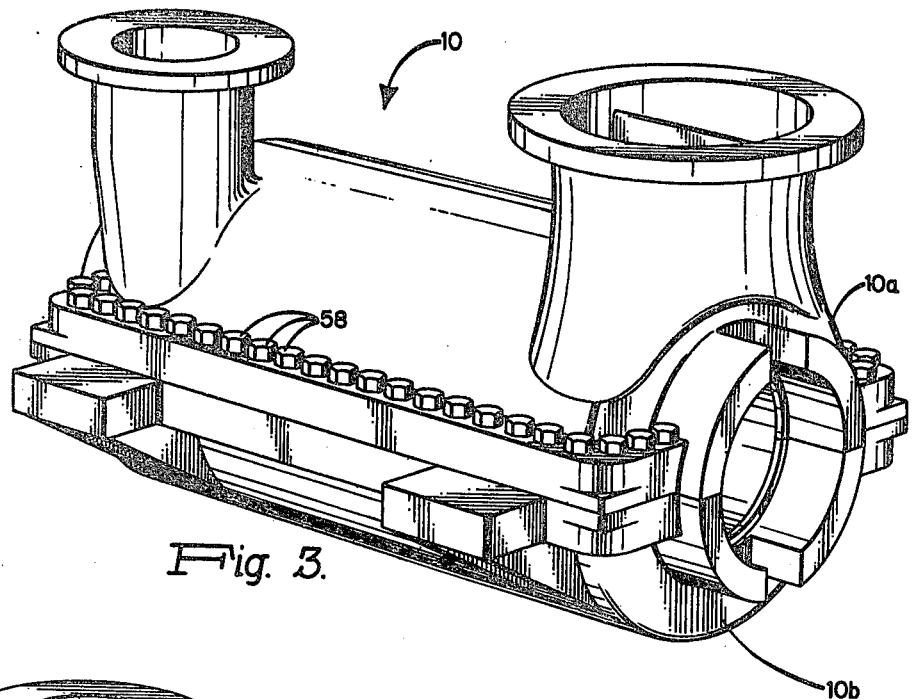
FIG. 3 is another perspective view showing the casing halves assembled.

Referring now to FIGS. 1-3, a horizontally split composite casing in accordance with the present invention is generally indicated at 10. A casing of this type is particularly suited for although not limited in application to, larger centrifugal compressors, for example those having internal diameters above 40 inches.

Beginning at the right-hand end as viewed in the drawings, it will be seen that casing 10 includes upper and lower cast inlet end sections 12 and 14. The upper inlet section 12 comprises a single integrally cast component having an inlet nozzle 16 with an upper flange 18, a heavy horizontal bolting flange 20 and bearing ring support flanges 22. The lower inlet end section 14 is constructed as a mating half for the upper inlet end section 12 and is also provided with heavy horizontal bolting flanges 24 and bearing ring support flanges 26.

At the opposite or left-hand end as viewed in the drawings, casing 10 further includes upper and lower cast outlet end sections 28 and 30. Upper outlet end section 28 also is an integrally cast component which includes an outlet nozzle 32 terminating in a second upper flange 34, with bolting flanges 36 extending horizontally and laterally from its lower edge. Likewise, the lower outlet end section 30 comprises a cast component which also includes bolting flanges 38. Although not shown, it will be understood that the upper and lower outlet end sections 28, 30 also include integrally cast bearing ring support flanges identical to the flanges 22, 26 associated with the inlet end sections 12, 14.

Casing 10 further includes semi-cylindrical upper and lower wrought shell sections 40 and 42. These shell sections are initially formed as flat hot-rolled sheets which are subsequently bent into the semi-cylindrical shapes shown in the drawings. Upper and lower horizontally extending bolting flanges 44, 46 are associated with the upper and lower shell sections 40, 42. Typically, the flanges 44, 46 are cut from hot-rolled flat sheets.

It will thus be seen that in the initial stage of fabrication, the casing 10 comprises a plurality of separate components, some of which are cast and others of which are wrought, typically by an initial hot rolling operation which produces heavy flat sheets which are then either cut or bent into desired shapes. The case components include the upper and lower inlet end sections 12, 14 and the upper and lower outlet end sections 28, 30.

Several important advantages are obtained by subdividing the casing 10 in the manner just described. For example, both the upper inlet and outlet end sections 12, 28 have a number of curved areas having very short radii, particularly at 48 where the nozzles and the bearing ring support flanges join the dished casing ends. In many circumstances, especially when the casing is being developed for high pressure applications, it would be difficult if not impossible to bend sufficiently thick materials to produce such short radii. Thus, where an all fabricated technique is being employed, the fabricator must either employ thinner gauge materials strengthened by externally welded gussets or the like, or the pressure rating of the casing must be lowered. By casting the end sections in accordance with the present invention, short radii can be developed while still employing optimum material thicknesses.

By initially separating the cast end sections 12, 14, 28 and 30 from the wrought shell sections 40, 42, large casting sizes and the problems associated therewith are avoided, thereby improving casting efficiency as well as the quality of the resulting product. The semi-cylindrical shell sections 40, 42 are wrought as by rolling and bending, since these techniques are particularly efficient and advantageous where the geometry of the components is relatively simple and does not include a multiplicity of bends, joints and the like.

The next stage in the development of a composite casing is accordance with the present invention is illustrated in FIG. 2. Here it will be seen that the previously described separate components have been assembled by welding into upper and lower casing halves indicated typically at 10a and 10b. In this regard, it will be seen that the upper casing half 10a is formed by welding the upper bolting flanges 44 to the upper shell section 40 along a line depicted schematically at 50, and by welding the upper inlet and outlet end sections 12, 28 and their respective bolting flanges 20, 36 to the upper shell section 40 and associated upper bolting flanges 44 along lines schematically indicated at 52. Welding operations of this type are relatively straightforward since they are performed at locations which are not complicated by tight bends, varying thicknesses of materials, etc.

The lower casing half 10b is developed in a similar manner by welding the lower bolting flanges 46 to the lower shell section 42, and by then welding the lower inlet and outlet end sections 14, 30 to the lower shell section 42 and its associated bolting flanges.

The bolting flanges of the lower casing half 10b are then drilled to accept heavy threaded bolts 54 which are adapted to protrude through holes 56 drilled in the bolting flanges of the upper casing half 10a.

As shown in FIG. 3, the upper casing half 10a may then be removably mounted on the lower casing half 10b with the bolts 54 protruding vertically through the holes 56. Thereafter, nuts 58 are threaded onto the bolts 54 to firmly secure the two casing halves together to provide pressure-tight housing for internally supported rotating components (not shown).

Figure 4:
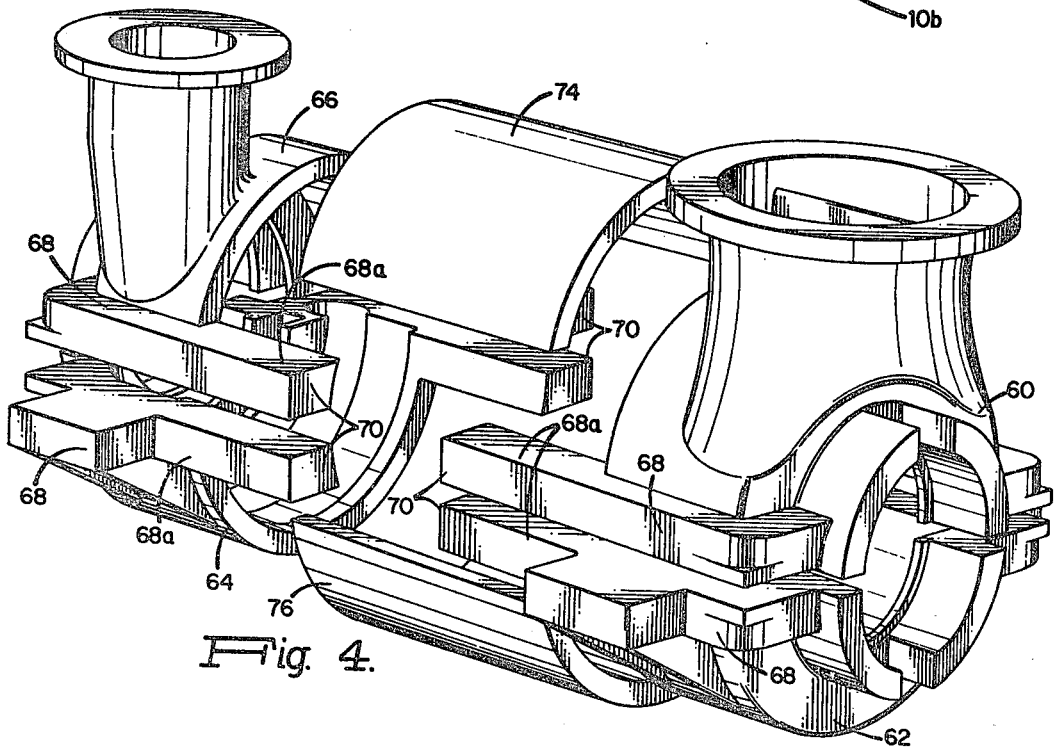
FIG. 4 is a view similar to FIG. 1 showing an alternate embodiment of the invention.

In the alternate embodiment shown in FIG. 4, the cast casing end sections 60, 62, 64 and 66 are each provided with bolting flanges 68 having integrally cast extensions 68a. These extensions are adapted to be butt-welded as 70 and also to be welded to the upper and lower semi-cylindrical shell sections 74, 76. The advantage of this embodiment over that shown in FIGS. 1–3 is that it decreases the number of butt welds in the bolting flanges 68.

It is my intention to cover these and any other changes and modifications to the embodiment herein chosen for purposes of disclosure which do not depart from the spirit and scope of the invention.

I claim:

1. A method of fabricating a horizontally split casing which includes:

(a) casting an inlet end having upper and lower seamless inlet end sections, one of which is provided with an integral inlet nozzle;

(b) casting an outlet end having upper and lower seamless outlet sections, one of which is provided with an integral outlet nozzle;

(c) fabricating separately from the inlet and outlet sections a generally cylindrical rigid shell, the shell being subdivided into upper and lower semi-cylindrical shell sections;

(d) welding permanently the upper semi-cylindrical shell section at its opposite ends respectively to the upper inlet and upper outlet end sections, thereby forming an upper casing half;

(e) welding permanently the lower semi-cylindrical shell section to the lower inlet and outlet end sections forming a lower casing half, the shell extending axially between the inlet and outlet end sections, the upper and lower casing halves being characterized by external bolting flanges, the bolting flanges having end segments which are formed integrally with the end sections, and having intermediate sections which are permanently joined to the shell section; and (f) removably mounting the upper casing half to the lower casing half.

* * * * *